June 21, 1949.　　　L. A. BROOKS　　　2,473,985
ELECTRICAL CONDUCTOR
Filed Feb. 18, 1944
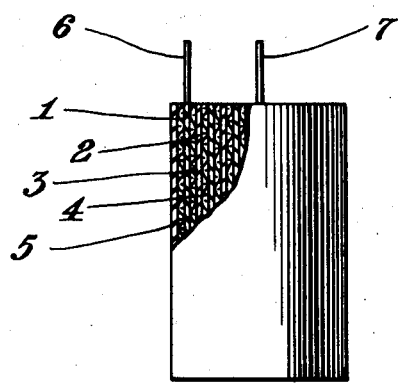
LESTER A BROOKS
INVENTOR.
BY
ATTORNEY Patented June 21, 1949

2,473,985

UNITED STATES PATENT OFFICE 2,473,985

ELECTRICAL CONDUCTOR

Lester A. Brooks, Stamford, Vt., assignor to Sprague Specialties Company, North Adams, Mass., a corporation of Massachusetts Application February 18, 1944, Serial No. 522,884

7 Claims. (Cl. 117—128.4)

This invention relates to improved electrical conductors insulated with improved dielectric compositions containing monomers and/or polymers of halogenated diphenylethylene and more particularly refers to compositions containing certain of said polymers and processes for their production and use.

Resinous dielectric compositions are well known in the art. Polymers of styrene, vinyl chloride and other compounds containing a vinyl linkage have been employed for this purpose. Condensation polymers such as the phenol-formaldehyde, or melamine-formaldehyde products are also used for this purpose. They should preferably possess a low electrical loss or power factor, a reasonably high dielectric constant, resistance to moisture and corrosive atmospheres, a high softening point, some degree of resilience, etc. For coating wires and the like, they should possess flexibility and resistance to abrasion.

It is an object of this invention to produce electrical conductors insulated with new dielectric compositions which reduce or eliminate entirely many disadvantages of prior art devices of this type. It is a further object to produce new and improved electrical condensers employing as insulating dielectric compositions certain resins or mixtures of resins to be hereinafter described. A still further object is to produce new and improved electrical conductors and semi-conductors insulated with porous electrical insulating materials, particularly those of a ceramic nature, where the pores thereof are thoroughly impregnated with certain resins or mixtures thereof. A still further object is to produce new resins having a multiplicity of important uses in the electrical and other fields, by means of simple and relatively inexpensive processes. A still further object is to produce new and improved resins and resin intermediates which may be substituted for or used in admixture with prior art resins for the numerous purposes wherein such resins have been used heretofore or are capable of use; for instance, in the manufacture of dielectric materials, molded articles, transparent moistureproof sheeting, water repellent and crease resistant, fibrous materials, plywoods, etc. Additional objects will become apparent from a consideration of the following description and claims.

These and other objects are attained in accordance with the here'n described invention wherein dielectric materials are produced by polymerizing at least one monomeric material conforming to the following general formula:

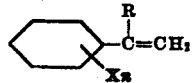

wherein R represents a substituted or unsubstituted aryl group, an aralkyl group, a cycloaliphatic group, or an alkyl group; X represents an inorganic and/or an organic radical; and $n$ represents 1, 2, 3, 4 or 5. The polymerized compounds described above or mixtures thereof are applied to an electrical conductor to insulate the latter by any one of a number of known methods, or they are applied thereto in the monomeric or partially polymerized state and polymerized in situ.

In a more restricted sense, this invention is concerned with electrical conductors insulated with compounds of the foregoing type in which the substituent represented by R in the above structural formula is a phenyl or methyl group. Where R is a phenyl group it may be substituted in the same manner as the other phenyl group of these compounds.

In a still more restricted sense, this invention is concerned with electrical conductors insulated with compounds of the foregoing type in which the substituent represented by R in the above structural formula is a phenyl group, and the substituents represented by X in the formula are chlorine or fluorine atoms.

In one of its specific embodiments this invention is directed to electrical condensers either of the stacked or rolled type but preferably the latter wherein the electrodes are separated and electrically insulated by a porous dielectric material impregnated with one or more of the materials referred to previously, impregnation occurring either before, during, and/or after polymerization thereof.

In another of its specific embodiments, this invention is concerned with electrical conductors coated with porous dielectric materials, preferably electrophoretically deposited ceramic material, wherein the pores are thoroughly impregnated with one or more of the polymeric compounds previously mentioned.

The invention is also concerned with the use of the monomeric compounds conforming to the structural formula referred to previously as dielectric materials without polymerization, and is further concerned with the use of the dimers of these compounds as dielectric insulating materials without further polymerization.

Other embodiments of the invention pertain to processes for the production of the foregoing and related materials, the new classes of resins heretofore and hereinafter described, and the employment of these materials not only in the electrical fields but also in other industrial arts wherein resins have heretofore been used or are capable of use. In particular, this invention pertains to the employment of these resins for the numerous purposes wherein durable, heat resistant, water resistant resins have heretofore been used or are capable of use.

In general, resins contemplated for use herein may be produced by polymerizing either alone or in admixture with one another and/or other polymerizable materials, compounds conforming to the structural formula referred to previously.

Compounds conforming to this formula and/or mixtures of said compounds with one another and/or with other polymerizable materials, may be readily polymerized by heat or other well known polymerization agents and/or catalysts to yield synthetic resins which are particularly suitable for use as dielectric compositions in the manufacture of electrical condensers, electrically insulated conductors, etc.

While there are many compounds conforming to the above structural formula, the following list of monomeric compounds which conform to this general formula have been found to give excellent results when employed in accordance with the instructions hereof:

When $R=C_6H_5$, $X=Cl$ and $n=1$.
   1 (o-chlorphenyl), 1 phenylethylene
   1 (m-chlorphenyl), 1 phenylethylene
   1 (p-chlorphenyl), 1 phenylethylene.

When $R=C_6H_5$, $X=Cl$ and $n=2$.
   1 (2,3 dichlorphenyl), 1 phenylethylene
   1 (2,4 dichlorphenyl), 1 phenylethylene
   1 (2,5 dichlorphenyl), 1 phenylethylene
   1 (2,6 dichlorphenyl), 1 phenylethylene
   1 (3,4 dichlorphenyl), 1 phenylethylene
   1 (3,5 dichlorphenyl), 1 phenylethylene.

When $R=C_6H_5$, $X=Cl$ and $n=3$.
   1 (2,3,4 trichlorphenyl), 1 phenylethylene
   1 (2,3,5 trichlorphenyl), 1 phenylethylene
   1 (2,3,6 trichlorphenyl), 1 phenylethylene
   1 (3,4,5 trichlorphenyl), 1 phenylethylene
   1 (3,4,6 trichlorphenyl), 1 phenylethylene
   1 (2,4,6 trichlorphenyl), 1 phenylethylene.

When $R=C_6H_5$, $X=F$ and $n=1$.
   1 (o-fluorphenyl), 1 phenylethylene
   2 (m-fluorphenyl), 1 phenylethylene
   3 (p-fluorphenyl), 1 phenylethylene.

When $R=C_6H_5$, $X=F$ and $n=2$.
   1 (2,3 difluorphenyl), 1 phenylethylene
   1 (2,4 difluorphenyl), 1 phenylethylene
   1 (2,5 difluorphenyl), 1 phenylethylene
   1 (2,6 difluorphenyl), 1 phenylethylene
   1 (3,4 difluorphenyl), 1 phenylethylene
   1 (3,5 difluorphenyl), 1 phenylethylene.

When $R=C_6H_5$, $X=F$ and $Cl$; and $n=2$.
   1 (2 fluor 3 chlorphenyl), 1 phenylethylene
   1 (2 fluor 4 chlorphenyl), 1 phenylethylene
   1 (2 fluor 5 chlorphenyl), 1 phenylethylene
   1 (2 fluor 6 chlorphenyl), 1 phenylethylene
   1 (3 fluor 4 chlorphenyl), 1 phenylethylene
   1 (3 fluor 5 chlorphenyl), 1 phenylethylene
   1 (3 chlor 4 fluorphenyl), 1 phenylethylene
   1 (2 chlor 3 fluorphenyl, 1 phenylethylene
   1 (2 chlor 4 fluorphenyl), 1 phenylethylene
   1 (2 chlor 5 fluorphenyl), 1 phenylethylene.

When $R=CH_3$; $X=Cl$ and $n=1$.
   1 (o-chlorphenyl), 1 methyl ethylene
   1 (p-chlorphenyl), 1 methyl ethylene
   1 (m-chlorphenyl), 1 methyl ethylene.

When $R=CH_3$; $X=F$; and $n=1$.
   1 (o-fluorphenyl), 1 methylethylene
   1 (m-fluorphenyl), 1 methylethylene
   1 (p-fluorphenyl), 1 methylethylene.

When $R=$p-chlorphenyl or $ClC_6H_4$; $X=Cl$ and $n=1$.
   1,1 (p,p' dichlordiphenyl) ethylene
   1,1 (m,p' dichlordiphenyl) ethylene
   1,1 (o,p' dichlordiphenyl) ethylene.

When $R=C_6H_5$, $X=CH_3$ and $n=1$.
   1 (o-tolyl), 1 phenylethylene
   1 (m-tolyl), 1 phenylethylene
   1 (p-tolyl), 1 phenylethylene.

It is to be understood, of course, that in place of or in addition to the compounds specifically enumerated above many other compounds conforming to the aforesaid general formula may be used.

One of the embodiments of this invention concerns methods of preparing the compounds disclosed herein. In this connection there are at least three methods for the preparation of these compounds, as will hereinafter be shown.

One suitable method for preparing these compounds is to treat the appropriate benzophenone derivative with the Grignard reagent of methylchloride, -bromide, -iodide, etc. Subsequent hydrolysis and dehydration produces the vinyl linkage. Some of the products from this reaction are oily liquids while others are solids or crystalline masses. The following examples of the preparation of some of the preferred compounds of this invention will serve to illustrate the reaction described above.

EXAMPLE 1

*Preparation of p-chlordiphenylethylene*

P-chlor-benzophenone was treated with the Grignard reagent of methyl bromide. After hydrolysis the resulting carbinol is dehydrated by dropping onto fused potassium sulfate or in some cases merely by heating and then purified by two distillations with silver powder. Boiling point of the p-chlor-diphenylethylene was 125° C./3 mm. and the yield was about 70%.

EXAMPLE 2

*Preparation of o-chlorodiphenylethylene*

The same procedure was used as in Example 1, starting with o-chlorobenzophenone. The product was highly insoluble. Boiling point is about 163° C./14 mm. The yield was about 65%.

EXAMPLE 3

*Preparation of m-chlordiphenylethylene*

The same procedure was used as in Example 1, starting with m-chlorbenzophenone. The purified product was a colorless oil boiling at 152-153° C./14 mm. pressure. It solidifies into needle-like crystals upon cooling. The yield was good.

EXAMPLE 4

*Preparation of o-fluordiphenylethylene*

The same procedure was followed as in Example 1, starting with o-fluorbenzophenone. The product obtained in a very good yield after purification—about 80%—boiled at 137° C./14 mm.

EXAMPLE 5

*Preparation of p,p' dichlordiphenylethylene*

The same procedure was followed as in Example 1, but using p,p' dichlorbenzophenone as a starting material. The product was recrystallized from methyl alcohol and had a melting point of 91° C.

Other methods which may be used to prepare these compounds will now be referred to. Asym-diphenylethane derivatives may be dehydrogenated catalytically to give the corresponding asym-diphenylethylene derivatives. A diphenylmethane derivative may be reacted with formaldehyde in the presence of a suitable catalyst to produce the desired diphenylethylene derivative and water, which is not miscible with the above. Another synthesis concerns the dehydrohalogenation of 1,1 diphenyl-2-chlor-ethane derivatives. An additional synthesis involves the reaction between a vinylidine halide (example—vinylidine chloride), aluminum chloride and benzene, the vinylidine halide and/or the benzene having the appropriate substituents thereon to give the desired 1,1 diphenylethylene derivative. Another synthesis is to react a substituted acetophenone with phenylmagnesium halide.

As regards the polymerization of the compounds of this invention, it is advisable to avoid the inclusion of accelerating agents which may affect the electrical properties of the resulting polymer deleteriously. It is advisable to hasten polymerization, in those cases where it occurs too slowly, by the use of external agents, such as actinic light, heat, pressure, etc.

According to another embodiment of the invention, monomers and/or dimers of the foregoing compounds may be used as plasticizers for these and other resins. Some of the compounds falling within the scope of this invention do not exhibit a tendency to polymerize readily, such as, for example, 1,1 diphenylethylene. These compounds may be used in the monomeric and dimeric state as dielectric materials, whether liquid or solid at normal operating temperatures, as well as plasticizers for higher polymers of the same or related materials.

Many of these compounds when in the monomeric form or dimeric form may be used as dielectrics per se. Many of these compounds, such as o-fluorodiphenylethylene, are oily liquids at normal operating temperatures and exhibit a high degree of stability as well as possessing a dielectric constant high enough to be satisfactory for general use in electrical condensers, transformers, cables and the like.

While the monomers, dimers and polymers disclosed herein generally possess outstanding electrical properties, it is often desirable to produce new dielectric compositions by copolymerizing one or more of them with one or more other polymerizable compounds which possess the vinyl linkage. Among these other polymerizable compounds are styrene and halogenated derivatives thereof disclosed in copending application S. N. 510,918 filed on November 19, 1943 by L. A. Brooks and M. Nazzewski, entitled "Improved electrical conductors", now U. S. 2,406,319; vinyl carbazole and derivatives thereof; acrylic acid and derivatives thereof; straight chain and isomeric olefins such as isobutylene; ethylene; tetrafluoroethylene, etc. By copolymerizing such compounds, dielectric resins of extraordinary stability, low power factor, good dielectric constant, and the like have been produced.

In some cases, it is desirable to combine dissimilar polymerized compounds by the use of mutual solvents, etc. Often this type of mixture possesses properties superior to those of the individual constituents. This expedient may be advisable when the polymerizing conditions of the individual monomers vary widely.

For electrical uses, the monomers, dimers and polymers disclosed herein should preferably possess a fairly high electrical moment, without at the same time possessing unduly high electrical losses. For this reason it is advisable to select compounds whose phenyl ring substituents are so located as to produce a fairly high electrical moment. In the cases where there is only one substituent (where $n=1$) it is generally advisable to choose the o- or m- positions for this substituent, while in those cases where $n=2$, the positions should be chosen so that the moment is not lowered by neutralization due to symmetrical or other positions, e. g., by using 1(3,4 dichlorphenyl), 1 phenylethylene, and the like.

It has been found that the fluoro derivatives are exceedingly stable in an electrical field, particularly at ultra high frequencies, where the effect of the electrical field upon the dielectric compound is very pronounced.

Since it is often desirable to obtain for electrical purposes a limited degree of polymerization, this may be accomplished by hydrogenating, chlorinating, etc. the polymerizable compound in order to stop the polymerization at the desired point. The resulting resinous mass or liquid will be exceedingly stable and will retain its physical and electrical properties over extended periods and under widely varying operating conditions. It is further contemplated that hydrogenation may be employed to stop polymerization and this may be followed by chlorination, to replace certain of the added or original hydrogen atoms, and thereby improve the properties of the resulting compounds.

Since it is often inadvisable to add the usual plasticizers such as tricresylphosphate, dibutylphthalate, etc. to polymers used in electrical fields, due to the increased power factor and lowered stability, new plasticizers have been developed which are particularly adapted for use herein. Some of these have been mentioned heretofore, i. e., the monomeric, dimeric and, in some cases, low polymeric compounds conforming to the general formula referred to previously. Others comprise the hydrogenated or saturated monomeric and dimeric compounds of the invention, as for example, the hydrogenated form of 1 (m-chlorphenyl), 1 phenylethylene which is 1 (m-chlorphenyl), 1 phenyl ethane. These saturated compounds have been employed most satisfactorily as plasticizers, and, in fact, are satisfactory dielectrics per se.

Organic and inorganic fillers such as zinc oxide, titanium dioxide, color pigments, wood flour, ground mica, talc, china clay and the like may be used to increase the body or to modify various properties of the monomeric and/or polymeric materials described herein. These materials may be used in the preparation of films, filaments, threads, plastic masses, lacquers, coatings, etc. They may be molded, extruded, or employed in solutions suspensions, or emulsions.

The attached drawing represents a condenser wherein the porous dielectric interspacer is impregnated with the compounds described herein.

The condenser shown comprises electrode foils 1 and 2 consisting of aluminum, lead, tin or the like, and interposed porous dielectric spacers 3 and 4 of kraft paper, linen paper and the like. The electrode foils 1 and 2 and spacers 3 and 4 are interwound in known manner to form a roll, and are enclosed by an insulating paper wrapping 5. Spacers 3 and 4 are thoroughly impregnated with a dielectric material in accordance with the invention, said dielectric material being preferably polymerized subsequent to the impregnation of the spacers.

Electrical connections to the foils 1 and 2 are provided by metal tabs 6 and 7 respectively, said tabs being embedded within the condenser roll and contacting therein the respective foils.

As many apparently widely different embodiments of this invention may be made without departing from the spirit and scope hereof, it is to be understood that the invention is not limited to the specific embodiments hereof except as defined in the appended claims.

I claim:

1. An electrical conductor insulated with a polymer of at least one monomeric material conforming to the following general formula:

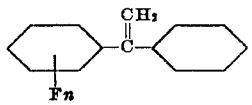

wherein $n$ represents an integer from 1 to 5.

2. An electrical conductor insulated with a polymer of at least one monomeric material conforming to the following general formula:

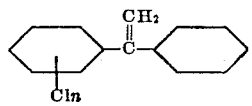

wherein $n$ represents an integer from 1 to 5.

3. An electrical conductor coated with a refractory dielectric material, the pores of said refractory dielectric material being substantially completely impregnated with the polymers described in claim 2.

4. An electrical conductor insulated with a polymer of 1,1 diphenylethylene, at least one of the phenyl groups of which is substituted with a halogen atom.

5. An electrical conductor insulated with a composition comprising a polymer of 1,1 diphenylethylene, at least one of the phenyl groups of which is substituted with a halogen atom selected from the group consisting of chlorine and fluorine atoms.

6. An electrical conductor insulated with a composition comprising a polymer of 1,1 diphenylethylene, at least one of the phenyl groups of which is substituted with a plurality of halogen atoms selected from the group consisting of chlorine and fluorine atoms.

7. An electrical conductor insulated with a composition comprising a polymer of 1,1 diphenylethylene, at least one of the phenyl groups of which is substituted with a single halogen atom selected from the group consisting of chlorine and fluorine atoms.

LESTER A. BROOKS.

REFERENCES CITED

The following references are of record in the file of this patent:

UNITED STATES PATENTS

| Number | Name | Date |
|---|---|---|
| 1,896,040 | Ruben | Jan. 31, 1933 |
| 1,982,539 | Reeves | Nov. 27, 1934 |
| 2,012,301 | Clark et al. | Aug. 27, 1935 |
| 2,106,850 | McCulloch | Feb. 1, 1938 |
| 2,256,160 | Britton et al. | Sept. 16, 1941 |
| 2,321,896 | Britton et al. | June 15, 1943 |

FOREIGN PATENTS

| Number | Country | Date |
|---|---|---|
| 475,951 | Great Britain | 1936 |
| 524,156 | Great Britain | 1940 |

OTHER REFERENCES

Beilstein, 4th ed. vol. V, page 640 (1922).